(12) United States Patent
Jain et al.

(10) Patent No.: US 7,354,565 B2
(45) Date of Patent: Apr. 8, 2008

(54) LEAD IRON TUNGSTATE CAPACITIVE TRANSDUCER, RELAXOR MATERIAL THEREFOR AND METHOD OF MANUFACTURE OF SAID RELAXOR MATERIAL

(75) Inventors: Kamlesh Kumar Jain, New Delhi (IN); Vinay Kumar, New Delhi (IN); Subhash Chand Kashyap, New Delhi (IN)

(73) Assignees: Council of Scientific & Industrial Research, New Delhi (IN); Indian Institute of Technology - Delhi, New Delhi (IN)

( * ) Notice: Subject to any disclaimer, the term of this patent is extended or adjusted under 35 U.S.C. 154(b) by 0 days.

(21) Appl. No.: 10/319,601

(22) Filed: Dec. 16, 2002

(65) Prior Publication Data

US 2003/0183014 A1    Oct. 2, 2003

Related U.S. Application Data

(62) Division of application No. 10/108,926, filed on Mar. 29, 2002, now Pat. No. 6,715,358.

(51) Int. Cl.
*C01G 21/00* (2006.01)
*C01G 41/00* (2006.01)
*C01G 49/00* (2006.01)

(52) U.S. Cl. .............. 423/594.1; 423/594.9; 423/594.13; 423/61

(58) Field of Classification Search ......... 423/594.1, 423/594.9, 594.13, 61
See application file for complete search history.

(56) References Cited

U.S. PATENT DOCUMENTS 4,840,926 A * 6/1989 Saburi et al. ............ 501/134
5,565,391 A * 10/1996 Nakano et al. .......... 501/135
6,087,286 A * 7/2000 Ikeda et al. ............. 501/135

OTHER PUBLICATIONS

Kumar Y et al: "A capacitive pressure gauge as a reliable transfer pressure standard" Sensors and Actuators B, Elsevier Sequoia S. A., Lausanne, CH, vol. 55, No. 2-3, May 11, 1999, pp. 217-221, XP004363529 ISSN: 0925-4005.

Valarinho P M et al: "Effect of excess of iron oxide and lead oxide on the microstructure and dielectric properties of lead-iron tungstate ceramics" Journal of the European Ceramic Society, 1993, UK, vol. 11, No. 5, pp. 407-415, XP009002666 ISSN: 0955-2219.

Zhou L et al: "Synthesis and characterization of lead iron tungstate ceramics obtained by two preparation methods" Mater Res Bull; Materials Research Bulletin Nov. 1994, vol. 29, No. 11 Nov. 1994, pp. 1193-1201, XP009002667.

International Search Report for PCT/IN 02/00078 dated Jan. 2, 2003.

* cited by examiner

*Primary Examiner*—Steven Bos
(74) *Attorney, Agent, or Firm*—Sughrue Mion, PLLC

(57) ABSTRACT

The present invention discloses a relaxor material lead iron tungstate which has been synthesized in doped and undoped conditions by single and two step heat treatment. The relaxor material is seen to exhibit almost negligible hysteresis and a transducer made thereby shows pressure measurement capability over a wide range from 0.5 MPa to 415 MPa with accuracy of ±0.05%.

3 Claims, 4 Drawing Sheets

COUNCIL OF SCIENTIFIC AND INDUSTRIAL RESEARCH

LEAD IRON TUNGSTATE CAPACITIVE TRANSDUCER, RELAXOR MATERIAL THEREFOR AND METHOD OF MANUFACTURE OF SAID RELAXOR MATERIAL

This is a divisional of application Ser. No. 10/108,926 filed Mar. 29, 2002; now U.S. Pat. No. 6,715,358 the above-noted application hereby incorporated herein by reference.

FIELD OF THE INVENTION

This invention relates to a lead iron tungstate capacitive transducer. More particularly, the invention relates to a lead iron tungstate capacitive pressure transducer with low temperature coefficient, high pressure coefficient and low hysteresis.

BACKGROUND OF THE INVENTION

Measurement of pressure is very vital in industrial manufacturing and processing. Particularly measurement of pressure with accuracy over a wide range is needed in such industries as automobiles, aerospace, steel and for synthesis of high strength materials. In all these industrial sectors, the accuracy in measurement is of paramount importance not only due to quality considerations but also to safety requirements. No single gadget can measure the entire pressure range with the same accuracy and reproducibility. The gadgets may also not be sensitive enough to small changes in pressure and be stable over a wide working temperature (in the range of 10-50° C.). A system is therefore required which will have the necessary characteristics of large pressure coefficient to detect small changes even in a large absolute value and have a minimum drift over a large temperature range i.e. have a low temperature coefficient.

Pressure measurements have traditionally been made using a liquid column manometer. While this serves as an absolute instrument, its use is limited to lower ranges for pressure of 0.1 Pa to 200 kPa. Another disadvantage of this device is that it cannot be transported easily from one place to another. P. L. M. Heydemann and B. E. Welch, et al in 'Experimental Thermodynamics', (Vol. II, B. LeNiendre and B. Vodar (eds), Butterworths (1975)), R. S. Dadson, et al in 'The Pressure Balance: Theory and Practice', National Physical Laboratory, Teddington, England and J. K. N. Sharma and Kamlesh K. Jain, Pramana, *J Phys* Vol 27 pp 417 (1986) disclose that pressures up to 300 MPa can be measured easily by piston gauges and that these piston gauges can be transported after taking certain precautions. However, these piston gauges cannot be used for pressures beyond 300 MPa without increasing the size of the entire assembly thereby making it cumbersome to use even with trained manpower. As a result this device is useless for fieldwork.

G. F. Molinar and L. Bianchi and J. K. N. Sharma, et al disclose the use of manganin resistance wires to sense pressures over a wide range. The main drawback of manganin resistance wires is the low accuracy of just ±0.1% when the requirement normally is of at least ±0.05% or better. Further this sensor has the undesirable property of zero shift with time leading to erroneous measurements and needs stringent temperature control during measurement. While this device may be useful for high-pressure work, the use for low pressure ranges like 58 Mpa is limited. In order to cover lower ranges one necessarily has to use another device.

Another pressure measuring device is disclosed by A. W. Birks (Report No. 1566 of Queen's University of Belfast). This disclosure describes the device as a Strain Gauge. However, this device also suffers from the same drawbacks as for manganin wire. Further the accuracy in pressure measurement of this device is low due to large hysteresis and zero shift.

Yet another type of a pressure measuring device based on resistance measurement has been disclosed in a U.S. Pat. No. 5,578,765. The said patent disclosure teaches that the pressure due to an applied force on a transducer array, essentially consisting of resistive elements leads to a change in the resistance value when the applied force is changed. The dependence of pressure is related to gradual touching of the two arrays thereby decreasing the resistance of the system. The inventors have disclosed curvilinear relation between the measured resistance and the applied pressure. At high pressures, the resistance drops to fairly low values. This low resistance values may not be measurable so accurately thereby leading to possible errors in pressure measurement. Another drawback is that the device of this patent needs a threshold pressure for it to act as a pressure sensor. As a result, the use of this device is limited in respect of pressures lower than the required threshold value.

G. F. Molinar, et al in 1998 attempted to use a ceramic rod to improve upon the existing pressure sensor (Measurement, Vol. 24, pp 161 (1998)). While this pressure transducer had improved resolution and sensitivity, it lacked repeatability and had marked hysteresis. The presence of last property is undesirable as this leads to increased error in the measured pressure.

PCT Application PCT/WO US9405313 discloses a capacitive transducer that can measure pressure from as low as 100 PSI to 22,000 PSI. However, the structure used is rather complicated—a metal diaphragm is separated from a dielectric alumina by as small a distance as 0.00005 inch and 0.020 inch. This small distance between the metal diaphragm and the insulator disc is difficult to maintain. Further the transducer when needed for a field experiment, does not possess the ruggedness to withstand transit movements. The device of this disclosure also has high hysteresis due to its very structure.

Andeen, et al, in Rev. of Sci. Instruments, Vol. 42, PP 495, (1971), disclose the use of ionic crystals as pressure sensing elements when formed as capacitor in sandwich structure. The pressure measurement is based on the principle of change in capacitance with applied pressure, of the capacitor structure with the material as dielectric medium between two electrodes. However the materials reported showed a larger change in capacitance by a change in temperature (temp. coefficient=250 ppm/° C.) and low pressure coefficient (−38 ppm/MPa). As a result, the materials disclosed serve more as temperature sensors rather than pressure sensors.

Kamlesh K. Jain and Subhash C. Kashyap in 'High Temperature and High Pressures' Vol. 27/28 pp 371 (1995), disclose the use of bismuth germanium oxide. It is disclosed that pressure coefficient and temperature coefficient of capacitance are 100 ppm/MPa and 60 ppm/° C. respectively. This is an indication of the utility of variation of capacitance with pressure as a means to measure pressure. The reliability is guaranteed to a certain extent due to low temperature coefficient but not to a level of being used as a pressure gauge.

Yet another material has been disclosed by M. V. Radhika Rao, et al in *J Material Science Letter* Vol. 12, pp 122 (1997). The material disclosed is a relaxor material with the following composition: 44% Lead Iron Niobate, 44% Lead Zirconium Niobate and 12% Barium Titanate. The pressure coefficient of this complex was observed to increase but without any significant decrease in temperature coefficient thereby again rendering the material not worthy of being used as a pressure transducer with capacitance parameter. Typical sintering process parameter as temperature: 900° C. The pressure coefficient was 430 ppm/MPa while temperature coefficient was +0.002/° C. Thus, the said relaxor material does not have much use as a pressure transducer.

The general draw back in all the prior art disclosure, is, therefore, low accuracy, limited usable pressure range, dependence on the need to maintain precise temperature of the transducer, and hysteresis.

OBJECTS OF THE INVENTION

The main object of the present invention is to provide a lead iron tungstate capacitive transducer.

Another object of the invention is to provide a process of preparation of lead iron tungstate material with low thermal coefficient, high-pressure coefficient and low hysteresis.

A further object of the invention is to provide a solid state calcination method for preparation of doped lead iron tungstate relaxor material.

A still further object of the present invention is to provide a two step calcination process for the preparation of lead iron tungstate relaxor material not requiring any doping.

Another object of the invention is to provide a capacitance pressure transducer for wide pressure range measurement from a low value of 0.5 MPa to a high value of 415 MPa.

SUMMARY OF THE INVENTION

Accordingly the present invention provides lead iron tungstate capacitive pressure transducer which comprises: a disc having a polished smooth first flat surface, a polished smooth second flat surface, the said polished smooth first flat surface being completely coated with metal electrode, the polished smooth second flat surface also being coated with metal electrode, the said metal electrode on polished smooth second flat surface comprising formed coated circular portions comprising a central portion and a coated annular concentric portion separated from the central portion by an annular concentric clear region, conducting metal wires being fixed to the metal electrode on polished smooth first flat surface, metal electrode on coated central portion of polished smooth second flat surface and metal electrode on coated annular concentric portion of polished smooth second flat surface.

In an embodiment of the present invention, the metal electrode is selected from the group consisting of silver, aluminum and gold.

In another embodiment of the present invention, the thickness of metal electrode is in the range of 1000-2000 Å.

In another embodiment of the present invention, the width of annular concentric region is in the range of 10-50 λ.

In yet another embodiment of the present invention, the metal wires are selected from gold and silver.

In another embodiment of present invention, purity of metal wire is at least 99.99%.

In a further embodiment of the present invention, the metal electrode is deposited by a known vacuum evaporation method such as thermal evaporation.

In a further embodiment of the present invention, the capacitive pressure transducer is useful for pressure measurement in a range of 0.5 MPa-415 MPa.

In another embodiment of the present invention, the accuracy of pressure transducer is ±0.05% over the entire range of 0.5 MPa-415 Mpa.

In yet another embodiment of the present invention, the absolute value of pressure coefficient of the transducer is in the range of 497 ppm/MPa to 622 ppm/MPa.

In another embodiment of the present invention, the temperature coefficient of the transducer is in the range of −0.006/° C. to 0.008/° C.

In another embodiment of the present invention, the transducer has negligible hysteresis.

The invention also relates to lead iron tungstate relaxor material used for manufacture of capacitive transducers comprising in undoped form stoichiometric $Pb(Fe_{2/3} W_{1/3})O_3$.

In one embodiment of the invention, the relaxor material is doped with lead in an amount of 1% by wt or 5% by weight.

The invention also relates to a process for the preparation of relaxor material useful in the manufacture of lead iron tungstate capacitive transducer by subjecting appropriate mixture of weighed amount of the wet ground iron oxide and tungsten oxide and lead oxide taken in such quantities so as to yield the final material as an undoped stoichiometric $Pb(Fe_{2/3} W_{1/3})O_3$ to solid state sintering.

In one embodiment of the process, the purity of the starting materials is at least 99.9%.

In another embodiment of the invention, excess PbO is used to obtain a self-doped stoichiometric relaxor material the level of doping being to the extent of 1% 5% by weight.

In another embodiment of the process, doping is done by adding excess amount of PbO salt in the initial mixture and wet grinding the mixture so obtained.

In another embodiment of the invention, the wet ground material is calcined at a temperature of at least 800° C. for a period of 2 hours.

In another embodiment of the invention, the calcined material is further ground for about ten hours to ensure complete homogenization of the mixed and reacted constituents.

In another embodiment of the invention, a binder, preferably polyvinyl alcohol is added to the homogenized powder.

The invention also relates to a two-step calcination process for the preparation of lead iron tungstate relaxor material by subjecting appropriate mixture of weighed amount of the wet ground iron oxide and tungsten oxide to calcination at a temperature of about 1000° C. for a period of 2 hours, subjecting the calcined material to further grinding for about ten hours after mixing the lead oxide to yield a final product stoichiometric $Pb(Fe_{2/3} W_{1/3})O_3$.

BRIEF DESCRIPTION OF THE ACCOMPANYING DRAWINGS

In the drawings accompanying this specification;

Figure 3:
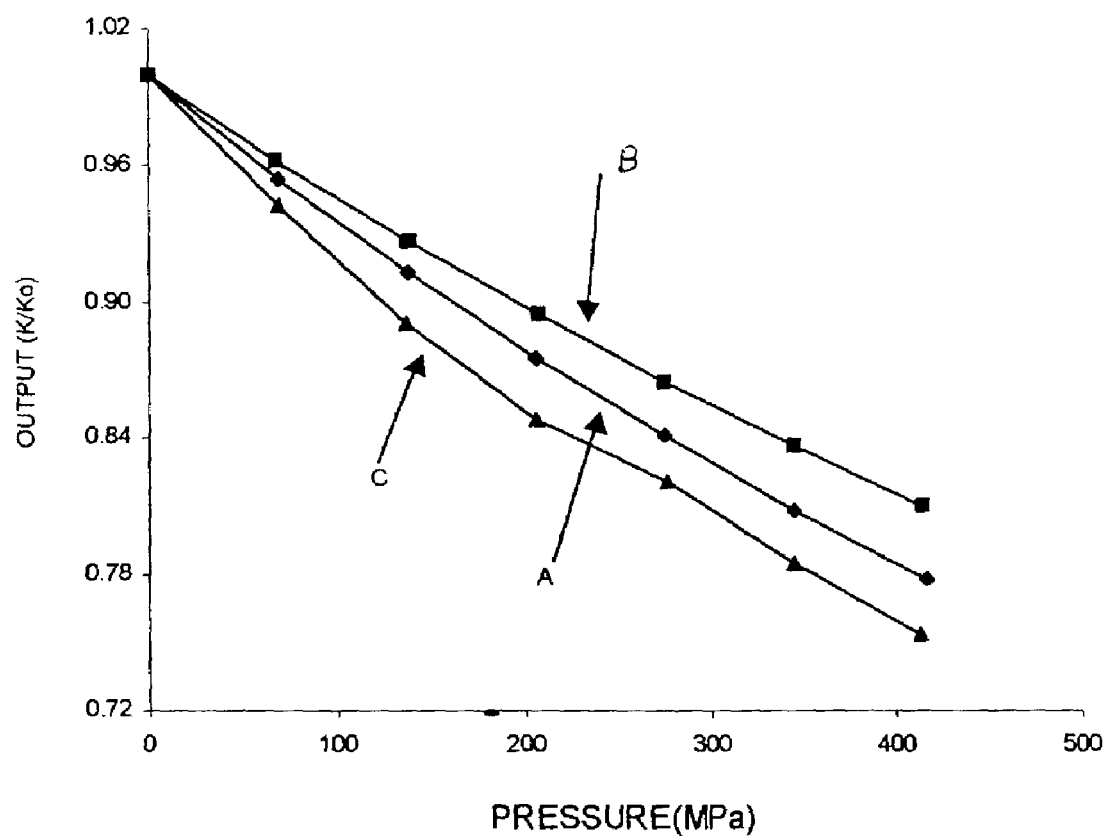

FIG. 3 represents variation of relative dielectric constant with pressure. Curve (A) is for the second calcination temperature of 750° C. Curve (B) is for the second calcination temperature of 810° C. and curve (C) is for the second calcination temperature of 830° C. The sample temperature during capacitance measurement is 30° C.

Figure 4:
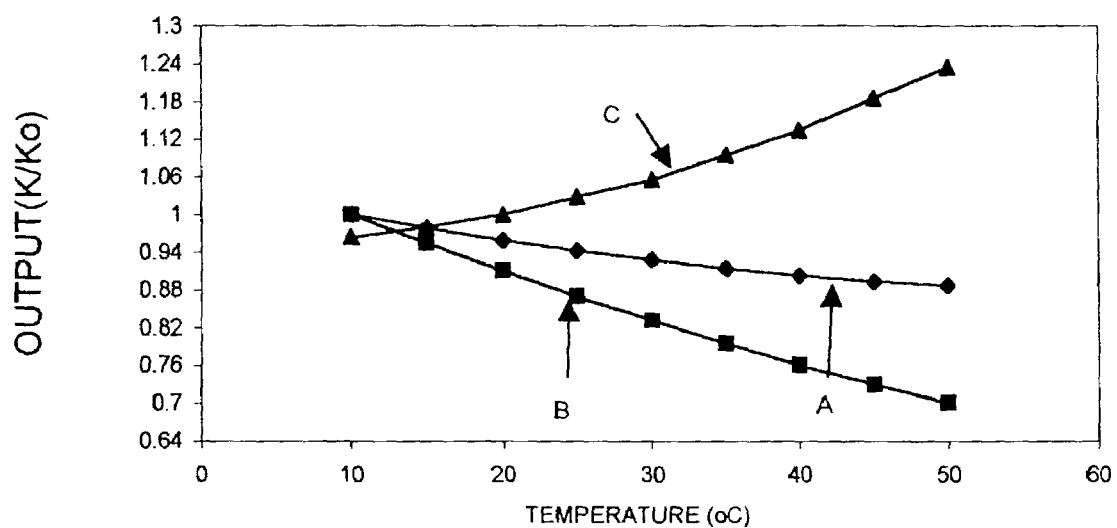

FIG. 4 represents variation of relative dielectric constant with temperature of the sample. Curve (A) is for the second calcination temperature of 750° C. Curve (B) is for the second calcination temperature of 810° C. and curve (C) is for second calcination temperature of 830° C. The applied pressure during all measurements was 0.1 MPa.

DETAILED DESCRIPTION OF THE INVENTION

The relaxor material of the present invention is prepared by solid state sintering. All the starting materials are pure and preferably have a purity of at least 99.9%. The materials are weighed in such quantities so as to yield the final material as an undoped stoichiometric $Pb(Fe_{2/3} W_{1/3})O^3$, (PFW). The same material can also be prepared by using excess PbO such that a self-doped stoichiometric PFW is obtained. Doping is done by putting excess amount of PbO salt in the initial mixture for wet grinding, for homogenization of the material.

Excess amount of lead oxide is added to compensate for any loss of the lead component due to high vapour pressure during high temperature treatment. The other advantage of adding excess lead oxide is to get self-doping of lead in the final material to see the effect on the characteristics.

The weighed and wet ground material is then calcined to effect the complete reaction of the oxides to form the PFW. The calcination is generally done at a temperature of at least 800° C. for a period of 2 hours. The calcined material is further ground for about ten hours. This long duration grinding is necessary to ensure complete homogenization of the mixed and reacted constituents. A binder, preferably polyvinyl alcohol was added to this powder. This mixture is then put in a pelletising machine for making samples.

In a preferred embodiment, two-step calcination process for the preparation of lead iron tungstate relaxor material is used. In this method, referred to as Columbite method, all the starting materials are pure and preferably have a purity of at least 99.9%. The materials are weighed in such quantities so as to yield the final material as a stoichiometric $Pb(Fe_{2/3} W_{1/3})O_3$ herein after referred to as PFW. The appropriate weighed amount of the wet ground iron oxide and tungsten oxide is mixed and then calcined at a temperature of preferably at 1000° C. for a period of 2 hours. The calcined material is further ground for about ten hours after mixing the lead oxide. This long duration grinding is necessary to ensure complete homogenization of the mixed and reacted constituents. The mixed calcined powder is again calcined at a temperature in a range of 750 to 830° C. and preferably at a temperature of 810° C. A binder, preferably polyvinyl alcohol is added to this powder. This mixture is then put in a pelletising machine for making disc shaped samples.

Typical size of the samples in both the preferred embodiments of preparation of relaxor material was, but not limited to, 18 mm in diameter and 1.5 mm thickness. The PFW samples prepared were then used to determine the parameters for pressure measurement. These samples were coated with a silver film on both sides by vacuum evaporation to complete the capacitive structure. The electrode structure was such that one flat surface of the disc was coated completely by a thin film of, preferably, silver. The other flat surface opposite to the first surface of the pellet was also coated with the silver film through a thin wire ring mask such that a central circular portion of the coated film was formed along with a peripheral annular concentric film at the rim. All the depositions were done by standard vacuum thermal evaporation systems. The two portions were separated by a narrow clear annular concentric space. Width of this clear annular space was typically 50 λ. The annular concentric ring was used to eliminate errors due to stray capacitance during ac measurements. Thin silver wires of purity 99.99% wee attached to the metal electrodes.

The so formed capacitive structure was then used to measure the thermal coefficient and the pressure coefficient of the doped and undoped PFW material prepared by the two preferred embodiments of this invention for the preparation of relaxor material.

For temperature and pressure measurement, the capacitive structure was placed in a standard specimen holder. This holder was placed in a conventional high pressure vessel. Temperature of the vessel was maintained to within ±0.05° C. using temperature bath (Model No. RTE 8DD, NESLAB, USA). Pressure was transmitted through diethyl hexyl sebacate fluid. At a preset constant temperature, pressure was varied gradually from atmospheric pressure (0.1 MPa to 415 Mpa) and the variation in the capacitance of the specimen was measured at fixed frequency of 1 kHz by the automatic capacitance bridge (Andeen Hagerling, model 2500 A, USA). During the measurement of pressure characteristics of the relaxor material, the data were taken of variation of capacitance with pressure increasing in magnitude as well as with decreasing pressure from the maximum pressure applied. This was done to determine the hysteresis in the material.

Figure 1:
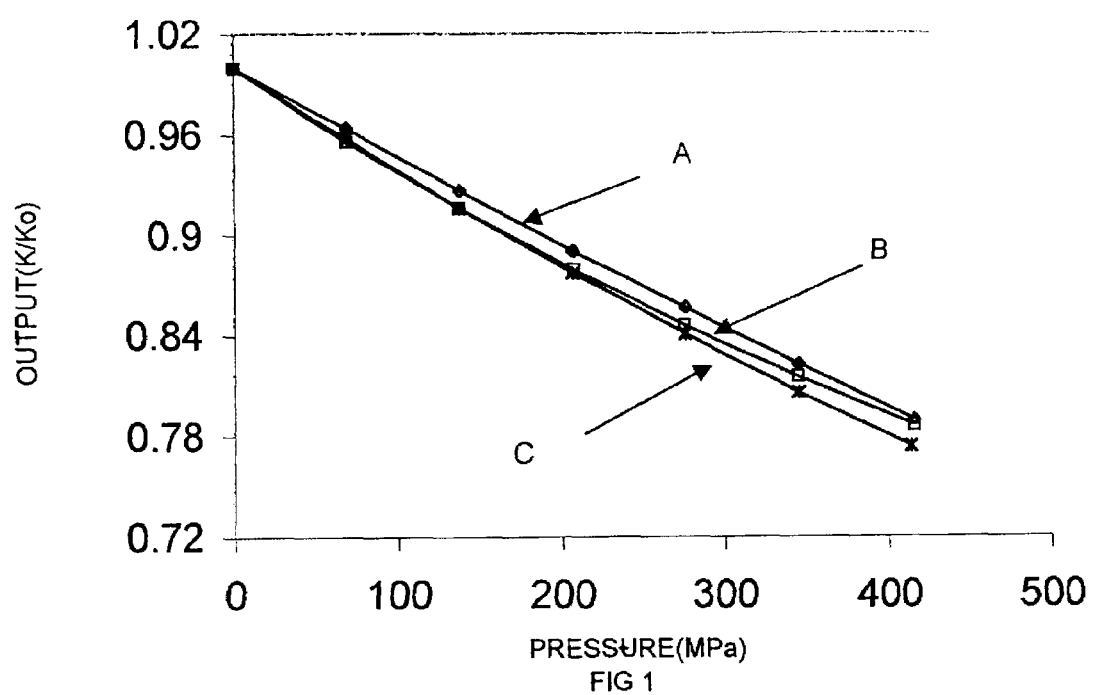
FIG. 1 represents variation of relative dielectric constant with pressure. Plot (A) is for pure lead iron tungstate material, (B) is for 1 wt % lead doped material and (C) is for 5 wt % lead doped material.

FIG. 1 shows the variation of the ratio $K/K_0$ with applied pressure at a sample temperature of 30° C. The ratio $K/K_0$ is determined by calculating the dielectric constants K and $K_0$ from the measured capacitance using the formula as given below:

$$\text{Dielectric constant} = \frac{\text{Thickness of pellet} \times \text{Capacitance}}{\text{Electrical permitivity of vacuum} \times \text{Area of parallel plate}}$$

Here K is the dielectric constant with pressure applied and $K_0$ is the dielectric constant without any applied pressure.

In FIG. 1, plot (A) is the variation of $K/K_0$ with pressure for undoped relaxor material and shows a near straight line without any hysteresis. Plot (B) in the same figure is for doped material with 1 wt % Pb. The slope of this line is seen to be more than that of (A) indicating the role of doping in improving pressure characteristics. This is due to the fact that a small change in pressure results in a large change in dielectric constant. Curve (C) is for a 5 wt % doped lead material which further gives an enhanced slope of the curve between_____ and pressure. Thus, increased doping leads to better characteristics of the material. The pressure coefficient being calculated by using the following expression:

$$\text{Pressure coefficient} = \frac{\text{Change in dielectric constant}}{\text{Initial Dielectric Constant} \times \text{change in pressure}}$$

Next keeping a fixed pressure say of 0.1 MPa, temperature was varied from 10° C. to 50° C. to measure the temperature coefficient of capacitance.

During the measurement of temperature characteristics of the relaxor material, data was taken of variation of capacitance with temperature increasing in magnitude as well as with decreasing temperature from the maximum temperature reached in order to determine the hysteresis in the material.

From the capacitance data and the dielectric constant, temperature coefficient and the pressure coefficient of the specimen were calculated using following formulas $$\text{Temperature coefficient} = \frac{\text{Change in the dielectric constant}}{\text{Initial Dielectric Constant} \times \text{change in temperature}}$$

The dielectric constant was determined using the capacitance value and other material parameters and constants from the expressions given earlier in the description.

Figure 2:
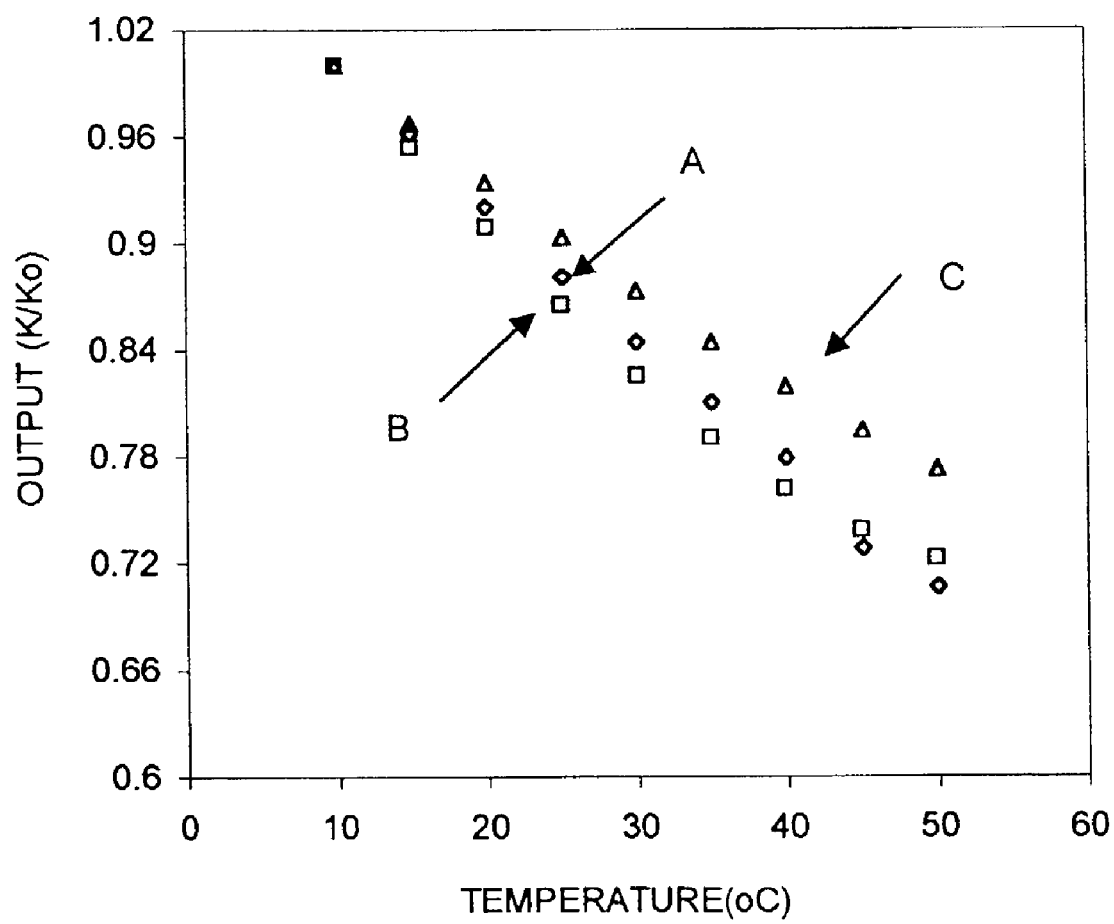
FIG. 2 represents variation of relative dielectric constant with temperature of the sample. Plot (A) is for pure lead iron tungstate material, (B) is for 1 wt % Pb doped material and (C) is for 5 wt % lead doped material.

FIG. 2 shows the variation of $K/K_0$ as a function of temperature at a given fixed pressure, say 0.1 MPa. Curve (A) is for undoped material while (B) and (C) are for 1 wt % and 5 wt % doped materials respectively. Plot (A) in the figure gives the slope of the variation as higher than that for plot (B) and (C). This clearly indicates that doping by lead improves the temperature behavior of the lead iron tungstate and that the material can be easily put to use as a pressure transducer having the desired property of high pressure coefficient, and low temperature coefficient.

FIG. 3 shows the variation of the ratio $K/K_0$ for the lead iron tungstate relaxor material samples prepared with the two-step calcination (Columbite process), with applied pressure at a sample temperature of 30° C., maintained to within ±0.05° C. The ratio $K/K_0$ is determined by calculating the dielectric constants K and $K_0$ from the measured capacitance using the following formula:

$$\text{Dielectric constant} = \frac{\text{Thickness of pellet} \times \text{Capacitance}}{\text{Electrical permitivity of vacuum} \times \text{Area of parallel plate}}$$

K is the dielectric constant with pressure applied and $K_0$ is the dielectric constant without any applied pressure.

In FIG. 3 plot (A) is the variation of $K/K_0$ with pressure for the relaxor material and shows a near straight line without any hysteresis. The plot is for a sample which was calcined for a second time at 750° C. after mixing required quantity of lead oxide for a stoichiometric material. Plot (B) in the same figure is for material with second calcination temperature of 810° C. The slope of this line is seen to be a bit less than that of (A) indicating the role of increase in sintering temperature on the pressure characteristics. Curve (C) is for a sample with second calcination temperature of 830° C., which shows some anomalous behaviour but has a tendency to give enhanced slope of the curve between $K/K_0$ and pressure. This points to the fact that increase in cacination temperature may affect the pressure characteristics. The pressure coefficient being calculated by using the following expression:

$$\text{Pressure coefficient} = \frac{\text{Change in dielectric constant}}{\text{Initial Dielectric Constant} \times \text{change in pressure}}$$

Next keeping a fixed pressure say of 0.1 MPa, temperature of the sample was varied from 10° C. to 50° C. to measure the temperature coefficient of capacitance.

During the measurement of temperature characteristics of the relaxor material, the data were taken of variation of capacitance with temperature increasing in magnitude as well as with decreasing temperature from the maximum temperature reached. This was done to determine the hysteresis in the material.

From the capacitance data the dielectric constant, temperature coefficient of the specimen were calculated using following formula $$\text{Temperature coefficient} = \frac{\text{Change in the dielectric constant}}{\text{Initial Dielectric Constant} \times \text{change in temperature}}$$

The dielectric constant was determined using the capacitance value and other material parameters and constants from the expressions given earlier in the description.

FIG. 4 shows the variation of $K/K_0$, as a function of temperature at a given fixed pressure, say 0.1 MPa. Here $K_0$ is the dielectric constant at 10° C. Plot (A) is the variation of $K/K_0$ with temperature for the relaxor material and does not show any hysteresis. The plot is for a sample, which was calcined for a second time at 750° C. after mixing the required quantity of lead oxide for a stoichiometric material. The curve shows a negative slope and decreasing with increasing temperature. This means that the material has a better temperature characteristic when worked at slightly higher temperature. Plot (B) in the same figure is for a material with second calcination temperature of 810° C. (B) in the figure gives the slope of the variation as higher than that for plot (A) though still being negative in the temperature range studied. Curve (C) is for a sample with second calcination temperature of 830° C. This curve shows an anomalous behavior compared to (A) and (B) but is still capable of being used as a pressure transducer. This is clearly indicative of the fact that the present process which does not use any doping material can be easily put to use as a pressure transducer having the desired property of high pressure coefficient and low temperature coefficient.

The above mentioned behavior in pressure and temperature characteristics may well be attributed to increase in grain size of the polycrystalline material which is formed as perovskite phase.

The scientific principle underlying the use of lead iron tungstate relaxor material for pressure measurement lies in the fact that these materials show a large change in capacitance per unit change in applied pressure. In other words these materials have a large pressure coefficient of capacitance. Another characteristic of the material is that it has a low value for temperature coefficient. This property is very desirable and essential for the material to act as a pressure sensor usable in an environment where temperature fluctuations are inevitable. Also the material to be useful as a pressure sensor should not have a memory effect i.e. should not have a hysteresis.

The novelty of the relaxor material of the present invention lies in its having low temperature coefficient, high pressure coefficient and low hysteresis due to the inventive step of doping by lead in excess of 1% of lead to the parent lead iron tungstate material.

For preparing the Lead Iron Tungstate [Pb(Fe$_{2/3}$ W$_{1/3}$)O$_3$—specimens abbreviated as PFW], starting oxides were PbO, Fe$_2$O$_3$ and WO$_3$. Specimens were prepared using following formula PbO+1/3Fe$_2$O$_3$+1/3WO$_3$+X where X is the excess (0%, 1%, 5%) wt. % of PbO. PFW was prepared as 7 gm sample by taking 4.4171 gm of PbO, 1.0535 gm of Fe$_2$O$_3$ and 1.5294 gm of WO$_3$.

In the two-step Coulumbite process X was zero.

The following examples are given by way of illustration only and should not be construed to limit the scope of the invention.

EXAMPLE-1

Weighed quantities of lead oxide, tungsten trioxide and ferric oxide were taken and mixed and wet ground in acetone for 10 hours. This mixture was then calcined at 810° C. for 2 h. The calcined powder was further ground for 10 hours. To this ground calcined powder, polyvinyl alcohol was added as binder, for making circular pellets of diameter 18 mm and thickness 1.5 mm. The pellet was later sintered at a temperature of 870° C. for 2 hours. After sintering the specimen was cooled and after polishing of the surfaces, silver electrodes were formed on the flat surfaces by vacuum evaporation.

EXAMPLE 2

The material of Example1 was used to measure the pressure characteristics. The temperature of the material was kept constant at 30° C. to within ±0.05° C. by keeping the material in a constant temperature bath. The capacitance of the capacitor structure incorporating the lead iron tungstate material; was measured as a function of pressure applied from 0.1 MPa to 415 MPa. The dielectric constant of the material was then calculated and plotted as a function of pressure. Pressure coefficient calculated from slope of variation of dielectric constant with pressure was found to be −500 ppm/MPa

EXAMPLE 3

The material of Example 1 was used to measure temperature characteristics. Pressure applied on the material was kept constant at 100 Mpa. Capacitance of the capacitor structure incorporating the lead iron tungstate material was measured as a function of temperature of the material (varying from 10-50° C.) keeping the temperature constant to within ±0.05° C. by keeping the material in a constant temperature bath. Dielectric constant of the material was then calculated and plotted as a function of temperature. The temperature coefficient calculated from the slope of the variation of dielectric constant with temperature was found to be −0.0066/° C.

EXAMPLE 4

Weighed quantities of lead oxide, tungsten trioxide and ferric oxide were taken and mixed with additional amount of 1 wt % PbO and wet ground in acetone for 10 hours. This mixture was then calcined at 810° C. for 2 h. The calcined powder was further ground for 10 hours. To this ground calcined powder, polyvinyl alcohol was added as binder for making circular pellets of diameter 18 mm and thickness 1.5 mm. The pellet was then sintered at a temperature of 870° C. for 2 hours. After sintering, the specimen was cooled and the surfaces polished and silver electrodes were formed by vacuum evaporation.

EXAMPLE 5

The material of Example 4 was used to measure pressure characteristics. Temperature of the material was kept constant at 30° C. to within ±0.05° C. by keeping the material in a constant temperature bath. Capacitance of the capacitor structure incorporating the lead iron tungstate material was measured as a function of pressure applied from 0.1 MPa to 415 MPa. Dielectric constant of the material was then calculated and plotted as a function of pressure. Pressure coefficient calculated from slope of variation of dielectric constant with pressure was found to be 515 ppn/Mpa.

EXAMPLE 6

The material of Example 4 was used to measure temperature characteristics. Pressure applied on the material was kept constant at 100 MPa Capacitance of the capacitor structure incorporating the lead iron tungstate material was measured as a function of temperature of the material (varying from 10-50° C.) keeping the temperature constant to within ±0.05° C. by keeping the material in a constant temperature bath. Dielectric constant of the material was then calculated and plotted as a function of temperature. Temperature coefficient calculated from slope of variation of dielectric constant with temperature was found to be −0.0069/° C.

EXAMPLE 7

Weighed quantities of lead oxide, tungsten trioxide and ferric oxide were taken and mixed with additional amount of 5 wt % PbO and wet ground in acetone for 10 hours. This mixture was then calcined at 810° C. for 2 h. The calcined powder was further ground for 10 hours. To this ground calcined powder, polyvinyl alcohol was added as binder for making circular pellets of diameter 18 mm and thickness 1.5 mm The pellet was then sintered at a temperature of 870° C. for 2 hours. After sintering, the specimen was cooled and the surfaces polished and silver electrodes formed by vacuum evaporation.

EXAMPLE 8

The material of Example 7 was used to measure pressure characteristics. Temperature of the material was kept constant at 30° C. to within ±0.05° C. by keeping the material in a constant temperature bath. Capacitance of the capacitor structure incorporating the lead iron tungstate material was measured as a function of pressure applied from 0.1 MPa to 415 MPa. Dielectric constant of the material was then calculated and plotted as a function of pressure. Pressure coefficient calculated from slope of the variation of dielectric constant with pressure and was found to be 556 ppm/Mpa.

EXAMPLE 9

The material of Example 7 was used to measure temperature characteristics. Pressure applied on the material was kept constant at 0.1 Mpa Capacitance of the capacitor structure incorporating the lead iron tungstate material was measured as a function of temperature of the material (varying from 10-50° C.) keeping the temperature constant to within ±0.05° C. by keeping the material in a constant temperature bath Dielectric constant of the material was then calculated and plotted as a function of temperature. Temperature coefficient calculated from slope of variation of dielectric constant with temperature was found to be −0.007° C.

EXAMPLE 10

Weighed quantity of wet ground iron oxide and tungsten oxide was calcined at a temperature of 1000° C. for a period of 2 hours. The calcined material was further ground for about ten hours after mixing the lead oxide. This mixture was then calcined at 750° C. for 2 h. The calcined powder was further ground for 10 hours. To this ground calcined powder polyvinyl alcohol was added as binder for making cylindrical shaped specimen which was then sintered at a temperature of 870° C. for 2 hours. After sintering, the specimen was cooled and after polishing of the surfaces, silver electrodes were formed by vacuum evaporation.

EXAMPLE 11

The material of Example 10 was used to measure pressure characteristics. Temperature of the material was kept constant at 30° C. to within ±0.05° C. by keeping material in a constant temperature bath. Capacitance of the capacitor structure incorporating the lead iron tungstate material was measured as a function of pressure applied from 0.5 MPa to 415 MPa. Dielectric constant of the material was then calculated and plotted as a function of pressure. Pressure coefficient calculated from slope of variation of dielectric constant with pressure was found to be −497 ppm/Mpa.

EXAMPLE 12

The material of Example 11 was used to measure temperature characteristics. Pressure applied on the material was kept constant at 0.1 Mpa Capacitance of the capacitor structure incorporating the lead iron tungstate material was measured as a function of temperature of the material (varying from 10-50° C.) keeping the temperature constant to within ±0.05° C. by keeping the material in a constant temperature bath. Dielectric constant of the material was then calculated and plotted as a function of temperature. Temperature coefficient calculated from slope of variation of dielectric constant with temperature was found to be −0.0033° C.

EXAMPLE 13

Weighed quantity of the wet ground iron oxide and tungsten oxide was calcined at a temperature of 1000° C. for a period of 2 hours. The calcined material was further ground for about ten hours after mixing the lead oxide. This mixture was then calcined at 810° C. for 2 h. The calcined powder was further ground for 10 hours. To this ground calcined powder polyvinyl alcohol was added as binder for making cylindrical shaped specimen which was then sintered at a temperature of 870° C. for 2 hours. After sintering, the specimen was cooled and after polishing of the surfaces, silver electrodes were formed by vacuum evaporation.

EXAMPLE 14

Material of Example 13 was used to measure pressure characteristics. Temperature of the material was kept constant at 30° C. to within ±10.05° C. by keeping the material in a constant temperature bath. Capacitance of the capacitor structure incorporating the lead iron tungstate material was measured as a function of pressure applied from 0.5 MPa to 415 MPa. Dielectric constant of the material was then calculated and plotted as a function of pressure. Pressure coefficient calculated from slope of variation of dielectric constant with pressure was found to be −534 ppm/Mpa.

EXAMPLE 15

The material of Example 13 was used to measure temperature characteristics. Pressure applied on the material was kept constant at 0.1 Mpa. Capacitance of the capacitor structure incorporating the lead iron tungstate material was measured as a function of temperature of the material (varying from 10-50° C.) keeping the temperature constant to within ±0.05° C. by keeping the material in a constant temperature bath Dielectric constant of the material was then calculated and plotted as a function of temperature. Temperature coefficient calculated from slope of variation of dielectric constant with temperature was found to be −0.008° C.

EXAMPLE 16

Weighed quantity of the wet ground iron oxide and tungsten oxide was calcined at a temperature of at 1000° C. for a period of 2 hours. The calcined material was further ground for about ten hours after mixing the lead oxide. This mixture was then calcined at 830° C. for 2 h. The calcined powder was further ground for 10 hours. To this ground calcined powder polyvinyl alcohol was added as binder for making cylindrical shaped specimen which was then sintered at a temperature of 870° C. for 2 hours. After sintering, the specimen was cooled and after polishing of the surfaces, silver electrodes were formed by vacuum evaporation.

EXAMPLE 17

Material of Example 16 was used to measure pressure characteristics. Temperature of the material was kept constant at 30° C. to within ±0.05° C. by keeping the material in a constant temperature bath. Capacitance of the capacitor structure incorporating the lead iron tungstate material was measured as a function of applied pressure from 0.1 MPa to 415 MPa. Dielectric constant of the material was then calculated and plotted as a function of pressure. The pressure coefficient calculated from slope of variation of dielectric constant with pressure was found to be −622 ppm/Mpa.

EXAMPLE 18

The material of Example 16 was used to measure temperature characteristics. Pressure applied on the material was kept constant at 0.1 Mpa. Capacitance of the capacitor structure incorporating the lead iron tungstate material was measured as a function of temperature of the material (varying from 10-50° C.) keeping the temperature constant to within ±0.05° C. by keeping the material in a constant temperature bath Dielectric constant of the material was then calculated and plotted as a function of temperature. Temperature coefficient calculated from slope of variation of dielectric constant with temperature was found to be 0.007° C.

The main advantages of the present invention are
1. The relaxor material can be used over a wide pressure range.
2. The relaxor material can be used under varying temperature ambiences thereby avoiding the use of additional means for temperature control.
3. The material can be used over a wide temperature range of 10-50° C.
4. The capacitive transducer can be used to measure pressure over a wide range from 0.5 MPa to 415 Mpa with an accuracy of ±0.05% over the entire range.

We claim:

1. A two-step calcination process for the preparation of lead iron tungstate relaxor material comprising subjecting appropriate initial mixture of starting materials of weighed amount of a wet ground iron oxide and tungsten oxide to calcination at a temperature of about 1000° C. for a period of 2 hours, subjecting the calcined material to further grinding for about ten hours after mixing lead oxide therein and then subjecting the mixed calcined material again to calcination at a temperature in a range of 750 to 830° C. to yield a final product stoichiometric $Pb(Fe_{2/3}W_{1/3})O_3$, wherein excess PbO is used to obtain a self-doped stoichiometric relaxor material, and doping is done by adding excess amount of PbO salt to the initial mixture and wet grinding the mixture so obtained in order to homogenize the mixture so obtained.

2. A process as claimed in claim 1 wherein the purity of the starting materials is at least 99.9%.

3. A process as claimed in claim 1 wherein a binder comprising polyvinyl alcohol is added to the homogenized mixture.

* * * * *